United States Patent
Hama et al.

(10) Patent No.: US 7,951,314 B2
(45) Date of Patent: May 31, 2011

(54) METHOD OF PRODUCING FUEL CELL AND PRODUCTION APPARATUS FOR FUEL CELL

(75) Inventors: Yuichiro Hama, Nagoya (JP); Masaki Terada, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 83 days.

(21) Appl. No.: 11/991,410

(22) PCT Filed: Sep. 7, 2006

(86) PCT No.: PCT/JP2006/318211
§ 371 (c)(1),
(2), (4) Date: Mar. 4, 2008

(87) PCT Pub. No.: WO2007/029873
PCT Pub. Date: Mar. 15, 2007

(65) Prior Publication Data
US 2009/0121384 A1 May 14, 2009

(30) Foreign Application Priority Data
Sep. 8, 2005 (JP) .................................. 2005-260024

(51) Int. Cl.
B29C 47/00 (2006.01)
H01M 8/24 (2006.01)
(52) U.S. Cl. .................... 264/149; 264/159; 429/466
(58) Field of Classification Search .................. 264/149, 264/157; 429/466
See application file for complete search history.

(56) References Cited

U.S. PATENT DOCUMENTS

| 4,753,765 | A  | * | 6/1988  | Pande ............................ 264/149 |
| 6,001,500 | A  |   | 12/1999 | Bass et al. |
| 6,060,188 | A  | * | 5/2000  | Muthuswamy et al. ......... 429/31 |
| 6,338,913 | B1 |   | 1/2002  | Eshraghi |
| 6,673,293 | B1 | * | 1/2004  | Mistopoulos et al. ......... 264/149 |
| 2003/0134170 | A1 | * | 7/2003  | Sarkar et al. ..................... 429/31 |
| 2005/0019636 | A1 | * | 1/2005  | Kwon et al. ..................... 429/32 |
| 2005/0147857 | A1 | * | 7/2005  | Crumm et al. ................... 429/31 |
| 2005/0181269 | A1 | * | 8/2005  | Eshraghi et al. ................ 429/44 |

FOREIGN PATENT DOCUMENTS

| JP | 2002-124273 | 4/2002 |
| JP | 2002-137277 | 5/2002 |
| WO | WO 01/24300 | 4/2001 |
| WO | WO 03/103079 | 12/2003 |

OTHER PUBLICATIONS

International Search Report.
Written Opinion of the ISR.

* cited by examiner

Primary Examiner — Matthew J Daniels
Assistant Examiner — Jeremiah Smith
(74) Attorney, Agent, or Firm — Finnegan, Henderson, Farabow, Garrett & Dunner, LLP

(57) ABSTRACT

A production apparatus for a tubular fuel cell, including a first extruder that supplies a first catalyst layer material to the outer peripheral surface of a cylindrically shaped inner electrode that exhibits conductivity, thereby forming a first catalyst layer, a second extruder that supplies an electrolyte layer material to the outer peripheral surface of the first catalyst layer, thereby forming an electrolyte layer, and a third extruder that supplies a second catalyst layer material to the outer peripheral surface of the electrolyte layer, thereby forming a second catalyst layer, wherein by conducting supply of the first catalyst layer material, the electrolyte layer material and the second catalyst layer material in an intermittent manner, at least a portion of the outer peripheral surface of the inner electrode is left exposed.

9 Claims, 7 Drawing Sheets

US 7,951,314 B2

METHOD OF PRODUCING FUEL CELL AND PRODUCTION APPARATUS FOR FUEL CELL

TECHNICAL FIELD

The present invention relates to a method of producing a fuel cell and a production apparatus for a fuel cell, and relates more particularly to a method of producing, and a production apparatus for, a tubular fuel cell.

BACKGROUND ART

Fuel cells, which generate electricity by converting chemical energy to electrical energy via an electrochemical reaction that uses, as raw materials, an oxidizing gas such as oxygen or air, and a reducing gas (a fuel gas) such as hydrogen or methane or a liquid fuel such as methanol are attracting considerable attention as one possible countermeasure to environmental problems and resource problems. In a fuel cell structure, a fuel electrode (an anode catalyst layer) on one surface of an electrolyte film and an air electrode (a cathode catalyst layer) on the other surface are provided facing one another across the electrolyte film, a diffusion layer is provided on the outside of each of these catalyst layers that sandwich the electrolyte film, and these diffusion layers are then sandwiched between separators that include raw material supply passages, and electricity is then generated by supplying the raw materials such as hydrogen and oxygen to each of these catalyst layers.

Tubular fuel cells are one known example of this type of fuel cell. As shown in the cross-sectional view along the lengthwise direction of the tube shown in FIG. 7, a typical structure for a tubular fuel cell includes an inner electrode 10, a first catalyst layer 12, an electrolyte layer 14, a second catalyst layer 16, an external coil 18, and a resin seal 20. FIG. 8 shows a cross-sectional view along the line A-A shown in FIG. 7. As shown in FIG. 8, the inner electrode 10, the first catalyst layer 12, the electrolyte layer 14, and the second catalyst layer 16 are laminated in sequence from the inside out, and are formed as substantially concentric circular cylinders.

In FIG. 7, the end portion of the inner electrode 10 is designed to be exposed externally. This is advantageous when a plurality of cells are used to form a module by connecting together the inner electrodes and external coils respectively of a plurality of tubular fuel cells in a parallel arrangement, and is particularly useful in those cases when the inner electrodes are connected in parallel.

Methods of fabricating the type of tubular fuel cell shown in FIGS. 7 and 8 in which, for example, the first catalyst layer 12, the electrolyte layer 14, and the second catalyst layer 16 are formed using an extrusion molding method or the like are already known.

For example, Japanese Patent Laid-Open Publication No. 2002-124273 discloses an apparatus and a method wherein a catalyst for the fuel electrode, a solid electrolyte polymer for the electrolyte film, and a catalyst for the air electrode are each converted to a flowable fluid using an appropriate solvent, and integrated extrusion molding is then conducted to form a bonded material comprising, from the inside out, a layer of each of the fuel electrode catalyst, the solid electrolyte polymer, and the air electrode catalyst.

However, in conventional techniques, in order to produce a tubular fuel cell similar to that shown in FIG. 7, an additional step is required for exposing the end portion of the inner electrode, namely, a step for removing the first catalyst layer, the electrolyte layer, and the second catalyst layer formed on the outer peripheral surface of the inner electrode end portion. Accordingly, there is a possibility of an associated increase in the production costs.

DISCLOSURE OF INVENTION

A method of producing a tubular fuel cell according to the present invention is a method of producing a tubular fuel cell having a cylindrical inner electrode that exhibits conductivity, a first catalyst layer, an electrolyte layer, and a second catalyst layer, wherein by intermittently conducting the steps of: supplying a first catalyst layer material to the outer peripheral surface of the inner electrode by extrusion molding, thereby forming the first catalyst layer; supplying an electrolyte layer material to the outer peripheral surface of the first catalyst layer by extrusion molding, thereby forming the electrolyte layer; and supplying a second catalyst layer material to the outer peripheral surface of the electrolyte layer by extrusion molding, thereby forming the second catalyst layer; the first catalyst layer, the electrolyte layer, and the second catalyst layer are formed with at least a portion of the outer peripheral surface of the inner electrode left exposed.

In the above method of producing a tubular fuel cell, following supply of the first catalyst layer material, the electrolyte layer material and the second catalyst layer material along the lengthwise direction of the inner electrode, the outer peripheral surface of the inner electrode is preferably exposed by temporarily stopping the supply of the first catalyst layer material, the electrolyte layer material and the second catalyst layer material.

The above method of producing a tubular fuel cell preferably further comprises a step of cutting the cell at the location where the outer peripheral surface of the inner electrode is exposed, thereby forming a plurality of tubular fuel cell single cells.

In the above method of producing a tubular fuel cell, the inner electrode is preferably formed from a porous material.

The above method of producing a tubular fuel cell preferably further comprises a drying step following at least one of the step of forming the first catalyst layer, the step of forming the electrolyte layer, and the step of forming the second catalyst layer.

Furthermore, a production apparatus for a tubular fuel cell according to the present invention is a production apparatus for a tubular fuel cell having a cylindrical inner electrode that exhibits conductivity, a first catalyst layer, an electrolyte layer, and a second catalyst layer, wherein the apparatus comprises a first supply unit that supplies a first catalyst layer material to the outer peripheral surface of the inner electrode by extrusion molding, thereby forming the first catalyst layer, a second supply unit that supplies an electrolyte layer material to the outer peripheral surface of the first catalyst layer by extrusion molding, thereby forming the electrolyte layer, and a third supply unit that supplies a second catalyst layer material to the outer peripheral surface of the electrolyte layer by extrusion molding, thereby forming the second catalyst layer, and by conducting the supply of the first catalyst layer material, the electrolyte layer material, and the second catalyst layer material in an intermittent manner, the first catalyst layer, the electrolyte layer, and the second catalyst layer are formed with at least a portion of the outer peripheral surface of the inner electrode left exposed.

In the above production apparatus for a tubular fuel cell, following supply of the first catalyst layer material, the electrolyte layer material and the second catalyst layer material along the lengthwise direction of the inner electrode, the outer peripheral surface of the inner electrode is preferably exposed by temporarily stopping the supply of the first catalyst layer material, the electrolyte layer material and the second catalyst layer material.

In the above production apparatus for a tubular fuel cell, at least one of the first supply unit, the second supply unit and the third supply unit preferably comprises an opening at a tip thereof, which is able to be brought into contact with, and retracted from, the outer peripheral surface of the inner electrode, and the supply of at least one of the first catalyst layer material, the electrolyte layer material and the second catalyst layer material is stopped by bringing the inner peripheral surface of the opening into contact with the outer peripheral surface of the inner electrode.

The above production apparatus for a tubular fuel cell preferably also comprises a synchronization unit that synchronizes the timing of the supply of the first catalyst layer material, the supply of the electrolyte layer material, and the supply of the second catalyst layer material.

In the above production apparatus for a tubular fuel cell, the inner electrode is preferably formed from a porous material.

The above production apparatus for a tubular fuel cell preferably further comprises a drying unit for drying at least one of the first catalyst layer, the electrolyte layer, and the second catalyst layer.

BEST MODE FOR CARRYING OUT THE INVENTION

As follows is a description of embodiments of the present invention, based on the appended drawings.

Figure 1:
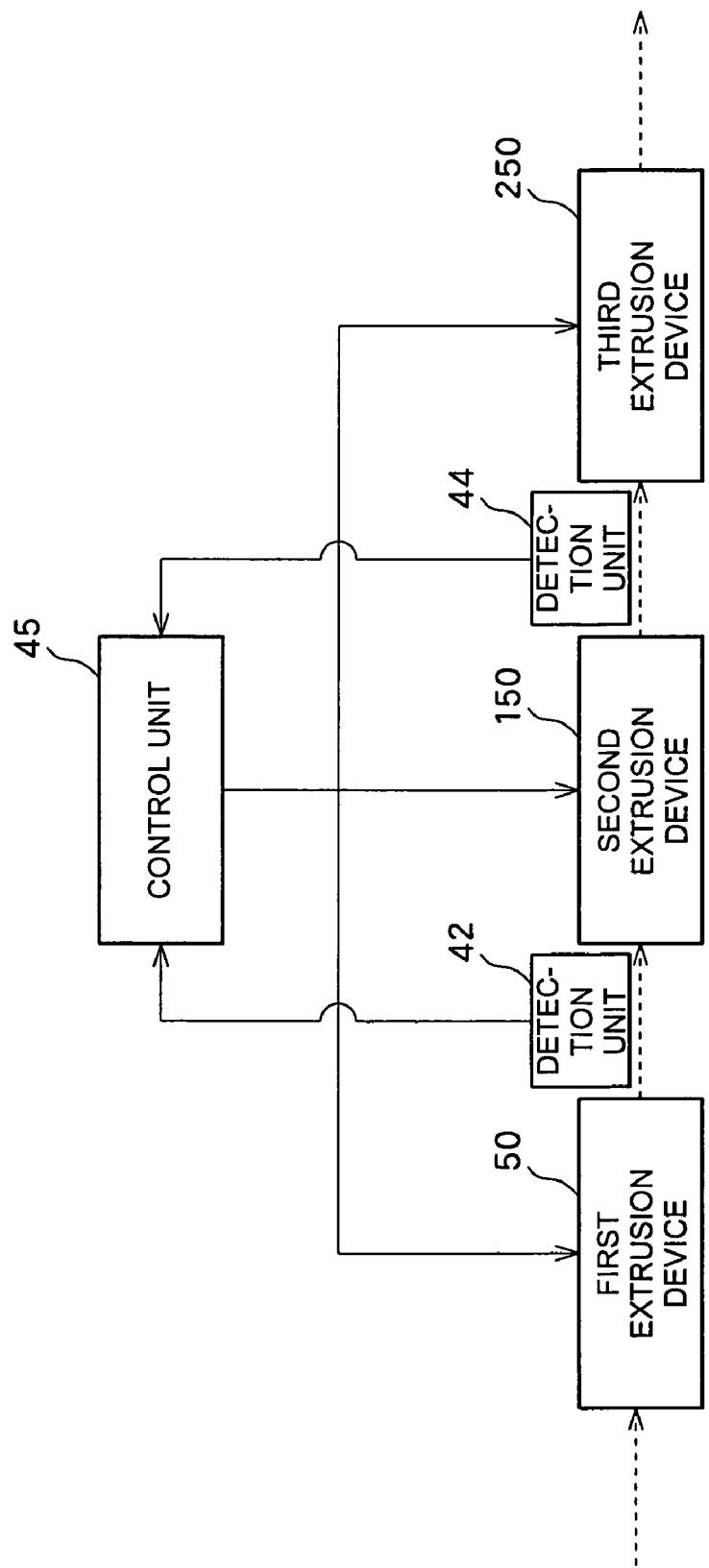
FIG. 1 is a block diagram of a production apparatus 100 for a tubular fuel cell according to an embodiment of the present invention.

FIG. 1 is a block diagram showing an outline of the structure of a production apparatus 100 for a tubular fuel cell according to an embodiment of the present invention. In FIG. 1, the production apparatus 100 for a tubular fuel cell includes a first extrusion device 50 that forms a first catalyst layer 12 on the outer peripheral surface of an inner electrode 10, a second extrusion device 150 that forms an electrolyte layer 14 on the outer peripheral surface of the first catalyst layer 12, and a third extrusion device 250 that forms a second catalyst layer 16 on the outer peripheral surface of the electrolyte layer 14. By passing the inner electrode 10 sequentially through these extrusion devices, a tubular fuel cell is formed in which the first catalyst layer 12, the electrolyte layer 14, and the second catalyst layer 16 are laminated sequentially to the outer peripheral surface of the inner electrode 10.

The timing for starting and stopping the supply of each of the layer materials supplied by the first extrusion device 50, the second extrusion device 150, and the third extrusion device 250 is controlled by a control unit 45. Furthermore, a detection unit 42 is provided between the first extrusion device 50 and the second extrusion device 150, and another detection unit 44 is provided between the second extrusion device 150 and the third extrusion device 250.

The detection unit 42 detects the position of the first catalyst layer 12, which has been supplied by the first extrusion device 50 along a predetermined length on the outer peripheral surface of the inner electrode 10, and sends the detected information to the control unit 45. Within the second extrusion device 150, the timing of the supply of the electrolyte layer material is controlled by the control unit 45 in accordance with the information from the detection unit 42, so that the electrolyte layer 14 is formed on the outer peripheral surface of the first catalyst layer 12.

Subsequently, the detection unit 44 detects the position of the electrolyte layer 14, which has been formed by the second extrusion device 150 along a predetermined length on the outer peripheral surface of the first catalyst layer 12, that is, along the same length as the first catalyst layer 12, and sends the detected information to the control unit 45. Within the third extrusion device 250, the timing of the supply of the second catalyst layer material is controlled by the control unit 45 in accordance with the information from the detection unit 44, so that the second catalyst layer 16 is formed on the outer peripheral surface of the electrolyte layer 14.

In other words, by using the detection unit 42, which incorporates an external diameter measurement device, and utilizing the difference in external diameter between the portion where the first catalyst layer 12 has been formed and the portion where the inner electrode 10 remains exposed, the position over which the first catalyst layer 12 has been formed can be determined, and based on the distance between the detection unit 42 and the second extrusion device 150, and the travel speed of the inner electrode 10, the formation of the electrolyte layer 14 is synchronized so as to enable formation on top of the first catalyst layer 12. In a similar manner, by using the detection unit 44, which incorporates an external diameter measurement device, and utilizing the difference in external diameter between the portion where the electrolyte layer 14 has been formed and the portion where the inner electrode 10 remains exposed, the position over which the electrolyte layer 14 has been formed can be determined, and based on the distance between the detection unit 44 and the third extrusion device 250, and the travel speed of the inner electrode 10, the formation of the second catalyst layer 16 is synchronized so as to enable formation on top of the electrolyte layer 14.

In this embodiment, synchronization within each of the extrusion devices 50, 150 and 250 was achieved by using the detectors 42 and 44 that each incorporate an external diameter measurement device, but the present invention is not restricted to this configuration. For example, the times at which the supply of each material is started and stopped within the first extrusion device 50 and the second extrusion device 150 respectively could be measured, and synchronization could then be achieved based on the distance between the upstream extrusion device 50 or 150 and the downstream extrusion device 150 or 250, and the travel speed of the inner electrode 10.

Figure 2:
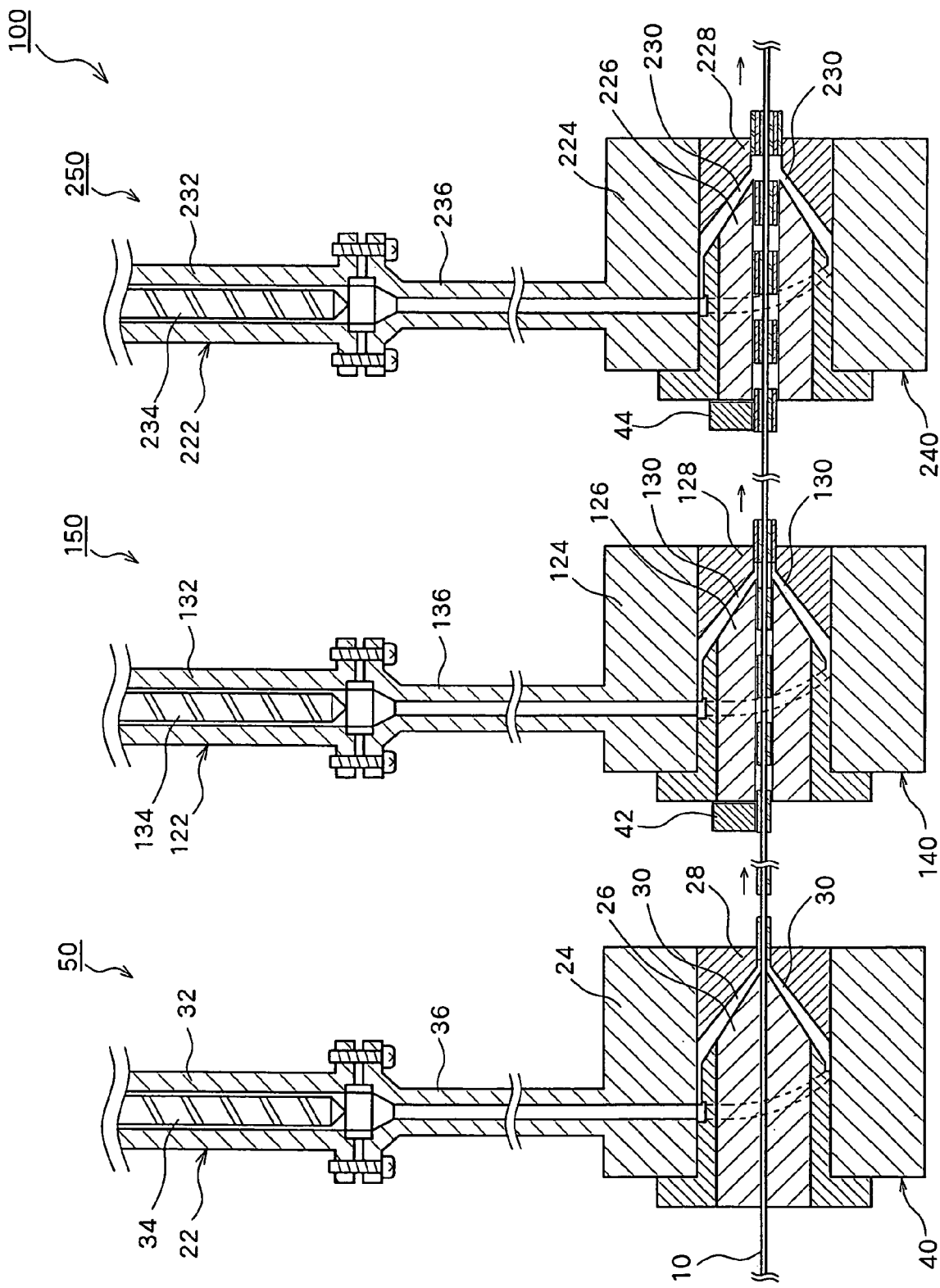
FIG. 2 is a cross-sectional view showing an outline of the structure of the production apparatus 100 for a tubular fuel cell according to an embodiment of the present invention.

Next is a more detailed description based on FIG. 2. FIG. 2 is a cross-sectional view showing an outline of the structure of the production apparatus 100 for a tubular fuel cell according to an embodiment of the present invention. In FIG. 2, the production apparatus 100 for a tubular fuel cell includes the first extrusion device 50 that forms the first catalyst layer 12 on the outer peripheral surface of the inner electrode 10, the second extrusion device 150 that forms the electrolyte layer 14 on the outer peripheral surface of the first catalyst layer 12, and the third extrusion device 250 that forms the second catalyst layer 16 on the outer peripheral surface of the electrolyte layer 14.

Figure 3:
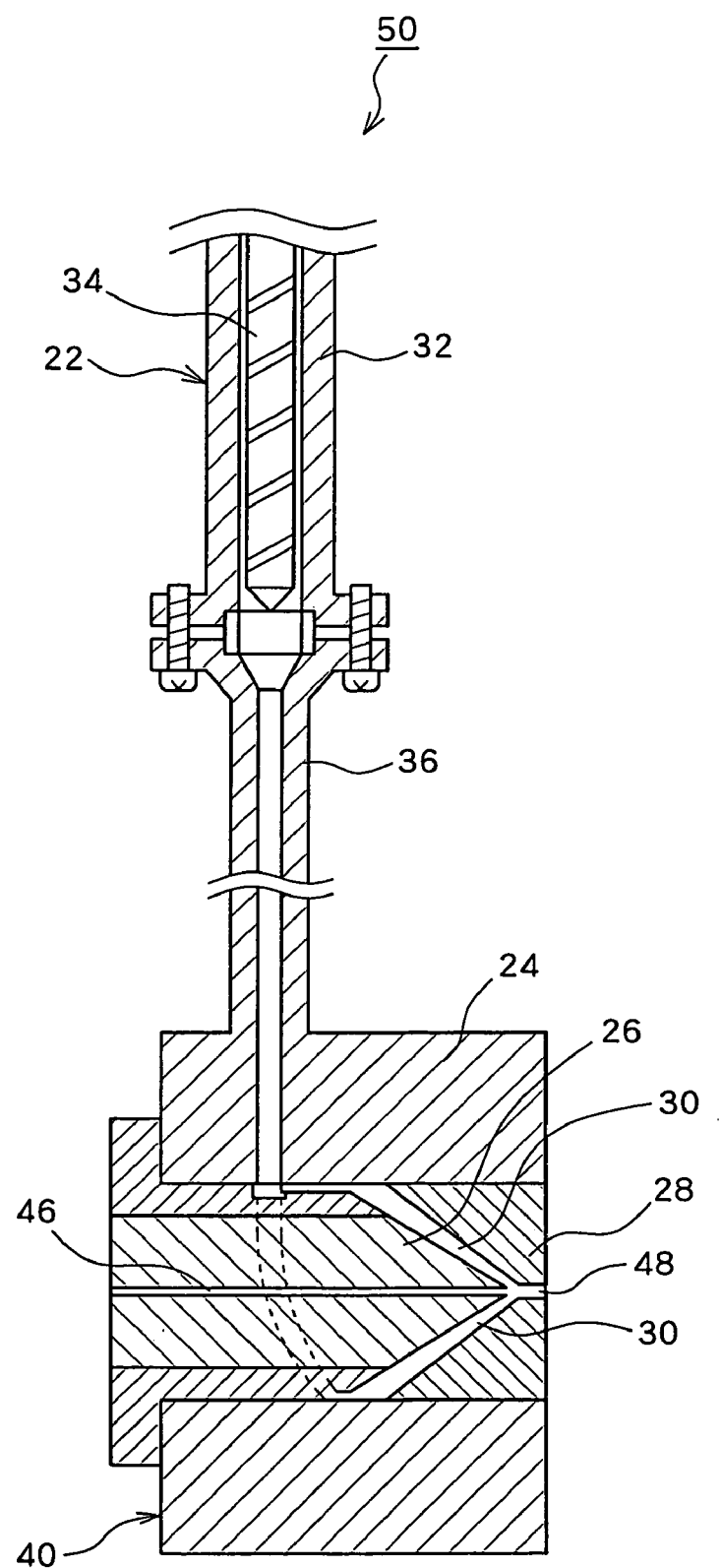
FIG. 3 is a cross-sectional view showing an outline of the structure of a first extrusion device 50.

FIG. 3 shows an outline of the structure of the first extrusion device 50. In FIG. 3, the first extrusion device 50 comprises a crosshead 40 that extrudes the first catalyst layer material so as to coat the outer peripheral surface of the inner electrode 10, and a first extruder 22 that supplies the first catalyst layer material to the crosshead 40.

The first extruder 22 has a structure in which a screw 34 is able to rotate freely inside a cylindrical extruder main body 32. The screw 34 is rotated at a desired speed using a motor that is not shown in the figures, via a belt or reduction gear or the like, also not shown in the figures.

The crosshead 40 includes a crosshead main body 24, a nipple 26, and a die 28. The crosshead main body 24 is a cylindrical shape that is open at both ends, and the nipple 26, which has a conically shaped tip, and the die 28, which is positioned at the tip of the nipple 26 with a predetermined spacing therebetween, are housed inside this crosshead main body 24.

The nipple 26 contains an aperture 46 that passes through the nipple along the central axis from the conically shaped tip, and the inner electrode 10 is able to be inserted inside this aperture 46. A space 30 is formed between the nipple 26, the crosshead main body 24, and the die 28. The die 28 is formed so as to surround the tip of the nipple 26, and includes an opening 48 formed in a position corresponding with the aperture 46 within the nipple 26. Furthermore, the die 28 comprises a plurality of substantially uniformly shaped members, which are arranged in a manner that enables these members to be moved closer to, or retracted from, the center of the opening 48, and by moving these members in or out in the direction of the center of the opening 48, the shape of the opening 48 can be altered. The size of the opening 48 can be reduced to the point where, when the inner electrode 10 passes through the opening 48, the die 28 makes contact with the passing inner electrode 10.

If the first catalyst layer 12 is designated the fuel electrode (the anode catalyst layer), then the first catalyst layer material comprises a plurality of raw materials including, for example, a catalyst in which platinum (Pt) or the like, together with another metal such as ruthenium (Ru), is supported on carbon or the like, a resin such as a solid polymer electrolyte like Nafion (a registered trademark), and a suitable solvent. In contrast, if the first catalyst layer 12 is designated the air electrode (the cathode catalyst layer), then the first catalyst layer material comprises a plurality of raw materials including, for example, a catalyst in which platinum (Pt) or the like is supported on carbon or the like, a resin such as a solid polymer electrolyte like Nafion (a registered trademark), and a suitable solvent. When these raw materials are fed into the extruder main body 32 from an inlet not shown in the figures, either as individual raw materials or in the form of a raw material mixture that has been premixed, and the screw 34 is rotated at a desired speed, the raw materials are kneaded and heated, thereby forming the first catalyst layer material. At the same time, by continuing the rotation of the screw 34, the thus formed first catalyst layer material is extruded from the first extruder 22, through a connecting tube 36, and into the crosshead 40.

The first catalyst layer material fed from the first extruder 22 into the crosshead 40 passes through the space 30 formed between the crosshead main body 24 and the die 28, and reaches the tip of the nipple 26. In other words, the space 30 acts as a passage for the first catalyst layer material fed from the first extruder 22.

Meanwhile, the inner electrode 10 is inserted inside the crosshead main body 24 so as to pass through the central aperture 46 in the nipple 26 and the opening 48 formed in the die 28, and is transported at a predetermined speed in the direction of the arrow by using a pull device or the like not shown in the figures. The first catalyst layer material, which has been fed from the first extruder 22 into the space 30 at a predetermined timing, is then supplied to the outer peripheral surface of the inner electrode 10 as it passes from the central aperture 46 of the nipple 26 through the tip of the nipple.

The inner electrode 10 with the first catalyst layer material supplied thereon then passes through the die 28, and is discharged from the first extrusion device 50. At this time, the first catalyst layer 12 is formed with a desired thickness determined by the outer peripheral surface of the inner electrode 10 and the inner peripheral surface of the die 28. Accordingly, compared with the size of the inner electrode 10 inserted into the die 28, that is, the diameter of the inner electrode 10, the size of the opening 48 formed in the die 28 is larger by a predetermined quantity, namely, is expanded by a width equivalent to the desired thickness of the first catalyst layer 12.

Generally, although the size of the die opening is fixed, if conditions such as the pressure exerted by the material extruded from the extruder or the temperature change, then the thickness of the extruded layer will also change. As such, the expression "a width equivalent to the desired thickness of the first catalyst layer 12" refers to the width that is able to ensure that the thickness of the final first catalyst layer 12 is the desired thickness, and in the following description, the expression "a width equivalent to the thickness of the layer" is used in the same manner.

Figure 6:
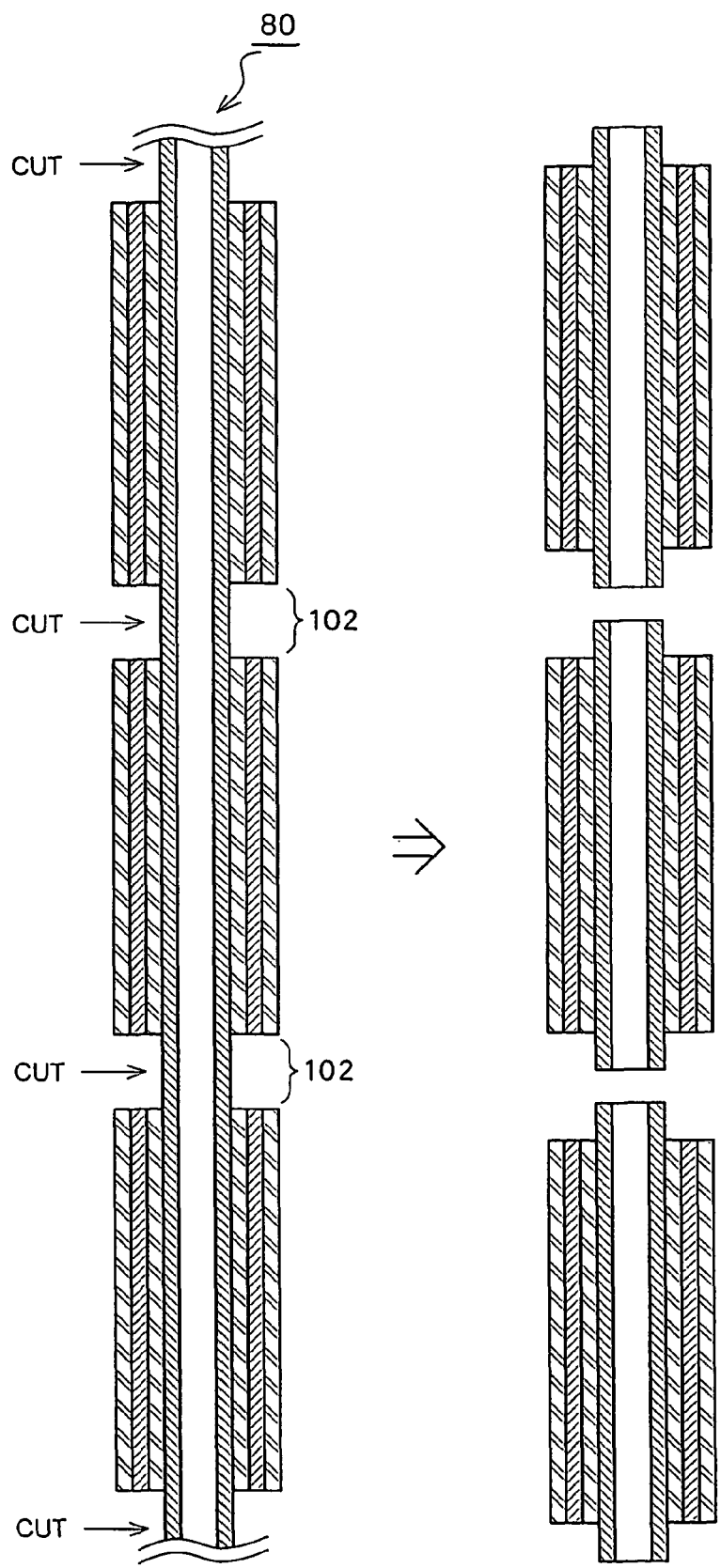
FIG. 6 shows an example of a method of obtaining tubular fuel cell single cells by cutting an intermittent laminate 80.

Once the first catalyst layer material has been supplied along a predetermined length on the outer peripheral surface of the inner electrode 10 by feeding the inner electrode 10 through the die at a predetermined speed while supplying the first catalyst layer material, the die 28 is brought into contact with the outer peripheral surface of the inner electrode 10, preferably at the same time that at least a portion of the space 30 is either blocked or closed off, thereby halting supply of the first catalyst layer material to the inner electrode 10. By continuing the movement of the inner electrode 10 with the supply of the first catalyst layer material halted, an exposed portion 102 such as that shown below in FIG. 6 is formed, wherein the first catalyst layer material does not cover the outer peripheral surface of the inner electrode 10.

Once this exposed portion 102 of the outer peripheral surface of the inner electrode 10 has been formed along a predetermined length, the die 28 is once again expanded to a width that is larger than the outer peripheral surface of the inner electrode 10 by a predetermined quantity, the space 30 is re-opened, and supply of the first catalyst layer material to the inner electrode 10 is restarted.

By moving the die 28 through a predetermined spacing in this manner, the first catalyst layer 12 can be formed intermittently, while exposed portions 102 of the outer peripheral surface of the inner electrode 10 are also formed.

The inner electrode 10 with the first catalyst layer 12 formed intermittently thereon is then transported to the second extrusion device 150. With the exception that the shapes of an aperture 146 in a nipple 126 and an opening 148 in a die 128 are different, the extrusion device has substantially the same structure as that of the first extrusion device 50. Accordingly, a figure equivalent to FIG. 3 is not included.

The second extrusion device 150 comprises a crosshead 140 that extrudes the electrolyte layer material so as to coat the outer peripheral surface of the first catalyst layer 12, and a second extruder 122 that supplies the electrolyte layer material to the crosshead 140.

The electrolyte layer material comprises a plurality of raw materials including, for example, a solid polymer electrolyte film such as a perfluorosulfonic acid-based material, and a suitable solvent. When these raw materials are fed into the extruder main body 132 from an inlet not shown in the figure, either as individual raw materials or in the form of a raw material mixture that has been premixed, and a screw 134 is rotated at a desired speed, the raw materials are kneaded and heated, thereby forming the electrolyte layer material. At the same time, by continuing the rotation of the screw 134, the thus formed electrolyte layer material is extruded from the second extruder 122, through a connecting tube 136, and into the crosshead 140.

The electrolyte layer material fed into the crosshead 140 passes through a space 130 formed between a crosshead main body 124 and the die 128, and reaches the tip of the nipple 126.

Meanwhile, the inner electrode 10 is inserted inside the crosshead main body 124 so as to pass through the central aperture 146 in the nipple 126 and the opening 148 formed in the die 128, and is transported at a predetermined speed in the direction of the arrow by using a pull device or the like not shown in the figure. The electrolyte layer material, which has been fed from the second extruder 122 into the space 130 at a predetermined timing, is then supplied to the outer peripheral surface of the first catalyst layer 12 that has been formed intermittently on the outer peripheral surface of the inner electrode 10, as the first catalyst layer 12 passes from the central aperture 146 of the nipple 126 through the tip of the nipple.

As the inner electrode 10 to which the electrolyte layer material has been supplied passes through the die 128 and is discharged from the second extrusion device 150, the electrolyte layer 14 is formed with a desired thickness determined by the outer peripheral surface of the first catalyst layer 12 and the inner peripheral surface of the die 128. Accordingly, compared with size of the opening 48 formed in the die 28, the size of the opening 148 formed in the die 128 is larger by a predetermined width, namely, is expanded by a width equivalent to the thickness of the desired electrolyte layer 14.

Once the electrolyte layer 14 has been formed on the outer peripheral surface of the region in which the first catalyst layer 12 has already been formed, by feeding the inner electrode 10 through the die at a predetermined speed while supplying the electrolyte layer material, the inner peripheral surface of the die 128 is brought into contact with the outer peripheral surface of the inner electrode 10, preferably at the same time that at least a portion of the space 130 is either blocked or closed off, thereby halting supply of the electrolyte layer material to the surface of the first catalyst layer 12. The movement of the inner electrode 10 is then continued with the supply of the electrolyte layer material halted, so that no electrolyte layer material is supplied to the exposed portion 102 of the inner electrode 10.

Once this exposed portion 102 formed along a predetermined length of the outer peripheral surface of the inner electrode 10 has passed, the die 128 is once again expanded to a width that is larger than the outer peripheral surface of the inner electrode 10 by a predetermined quantity, the space 130 is re-opened, and supply of the electrolyte layer material to the first catalyst layer 12 is restarted.

By moving the die 128 through a predetermined spacing in this manner, the electrolyte layer 14 can be formed intermittently, while the exposed portions 102 of the outer peripheral surface of the inner electrode 10 are retained.

At this time, the detection unit 42 which incorporates, for example, an external diameter measurement device is preferably provided upstream from the second extrusion device 150, and is used for detecting the portion where the first catalyst layer 12 has been formed and/or the exposed portion 102 on the outer peripheral surface of the inner electrode 10, and then calculating the timing for the intermittent supply of the electrolyte layer material based on factors such as the travel speed of the inner electrode 10. By providing this type of synchronization device, the electrolyte layer material can be supplied reliably to the outer peripheral surface of the first catalyst layer 12 formed intermittently on the outer peripheral surface of the inner electrode 10.

The inner electrode 10 with the electrolyte layer 14 formed intermittently thereon is then transported to the third extrusion device 250. With the exception that the shapes of an aperture 246 in a nipple 226 and an opening 248 in a die 228 are different, the extrusion device has substantially the same structure as that of the first extrusion device 50. Accordingly, a figure equivalent to FIG. 3 is not included.

The third extrusion device 250 comprises a crosshead 240 that extrudes the second catalyst layer material so as to coat the outer peripheral surface of the electrolyte layer 14, and a third extruder 222 that supplies the second catalyst layer material to the crosshead 240.

If the second catalyst layer 16 is designated the air electrode (the cathode catalyst layer), then the second catalyst layer material comprises a plurality of raw materials including, for example, a catalyst in which platinum (Pt) or the like is supported on carbon or the like, a resin such as a solid polymer electrolyte like Nafion (a registered trademark), and a suitable solvent. In contrast, if the second catalyst layer 16 is designated the fuel electrode (the anode catalyst layer), then the second catalyst layer material comprises a plurality of raw materials including, for example, a catalyst in which platinum (Pt) or the like, together with another metal such as ruthenium (Ru), is supported on carbon or the like, a resin such as a solid polymer electrolyte like Nafion (a registered trademark), and a suitable solvent. When these raw materials are fed into an extruder main body 232 from an inlet not shown in the figure, either as individual raw materials or in the form of a raw material mixture that has been premixed, and a screw 234 is rotated at a desired speed, the raw materials are kneaded and heated, thereby forming the second catalyst layer material. At the same time, by continuing the rotation of the screw 234, the thus formed second catalyst layer material is extruded from the third extruder 222, through a connecting tube 236, and into the crosshead 240.

The second catalyst layer material fed into the crosshead 240 passes through a space 230 formed between a crosshead main body 224 and the die 228, and reaches the tip of the nipple 226.

Meanwhile, the inner electrode 10 is inserted inside the crosshead main body 224 so as to pass through the central aperture 246 in the nipple 226 and the opening 248 formed in the die 228, and is transported at a predetermined speed in the direction of the arrow by using a pull device or the like not shown in the figure. The second catalyst layer material, which has been fed from the third extruder 222 into the space 230 at a predetermined timing, is then supplied to the outer peripheral surface of the electrolyte layer 14 that has been formed intermittently on the outer peripheral surface of the inner electrode 10, as the electrolyte layer 14 passes from the central aperture 246 of the nipple 226 through the tip of the nipple.

As the inner electrode 10 to which the second catalyst layer material has been supplied passes through the die 228 and is discharged from the third extrusion device 250, the second catalyst layer 16 is formed with a desired thickness determined by the outer peripheral surface of the electrolyte layer 14 and the inner peripheral surface of the die 228. Accordingly, compared with size of the opening 148 formed in the die 128, the size of the opening 248 formed in the die 228 is larger by a predetermined width, namely, is expanded by a width equivalent to the thickness of the desired second catalyst layer 16.

Once the second catalyst layer 16 has been formed on the outer peripheral surface of the region in which the electrolyte layer 14 has already been formed, the inner peripheral surface of the die 228 is brought into contact with the outer peripheral surface of the inner electrode 10, preferably at the same time that at least a portion of the space 230 is either blocked or closed off, thereby halting supply of the second catalyst layer material to the surface of the electrolyte layer 14. The movement of the inner electrode 10 is then continued with the supply of the second catalyst layer material halted, so that no second catalyst layer material is supplied to the exposed portion 102 of the inner electrode 10.

Once this exposed portion 102 formed along a predetermined length of the outer peripheral surface of the inner electrode 10 has passed, the die 228 is once again expanded to a width that is larger than the outer peripheral surface of the inner electrode 10 by a predetermined quantity, the space 230 is re-opened, and supply of the second catalyst layer material to the electrolyte layer 14 is restarted.

By moving the die 228 through a predetermined interval in this manner, the second catalyst layer 16 can be formed intermittently, while the exposed portions 102 of the outer peripheral surface of the inner electrode 10 are retained.

At this time, the detection unit 44 which incorporates, for example, an external diameter measurement device is preferably provided upstream from the third extrusion device 250, and is used for detecting the portion where the electrolyte layer 14 has been formed and/or the exposed portion 102 on the outer peripheral surface of the inner electrode 10, and then calculating the timing for the intermittent supply of the second catalyst layer material based on factors such as the travel speed of the inner electrode 10. By providing this type of synchronization device, the second catalyst layer material can be supplied reliably to the outer peripheral surface of the electrolyte layer 14 formed intermittently on the outer peripheral surface of the inner electrode 10. In this embodiment, if a continuous process in which layer formation is conducted by feeding the inner electrode 10 continuously through the first extrusion device 50, the second extrusion device 150 and the third extrusion device 250 is conducted, then the detection unit 44 may be omitted, and the operations of each of the extrusion devices synchronized using the detection unit 42.

In the embodiment described above, the production apparatus 100 for a tubular fuel cell has a configuration that assumes a continuous process in which layer formation is conducted by feeding the inner electrode 10 continuously through the first extrusion device 50, the second extrusion device 150 and the third extrusion device 250, but the present invention is not restricted to such a configuration. For example, in those cases where the length of the inner electrode 10 is shorter than the length of travel through the apparatus, each layer formation step could be completed and then halted before the next layer formation step is conducted, meaning the layer formation is conducted in a stop-start manner. Furthermore, if layer formation is conducted using an inner electrode 10 that has been prepared with a predetermined length as a tubular fuel cell single cell, then a tubular fuel cell in which exposed portions 102 are formed at both ends of the inner electrode 10 can be formed without the need for the cutting step described below.

Figure 4:
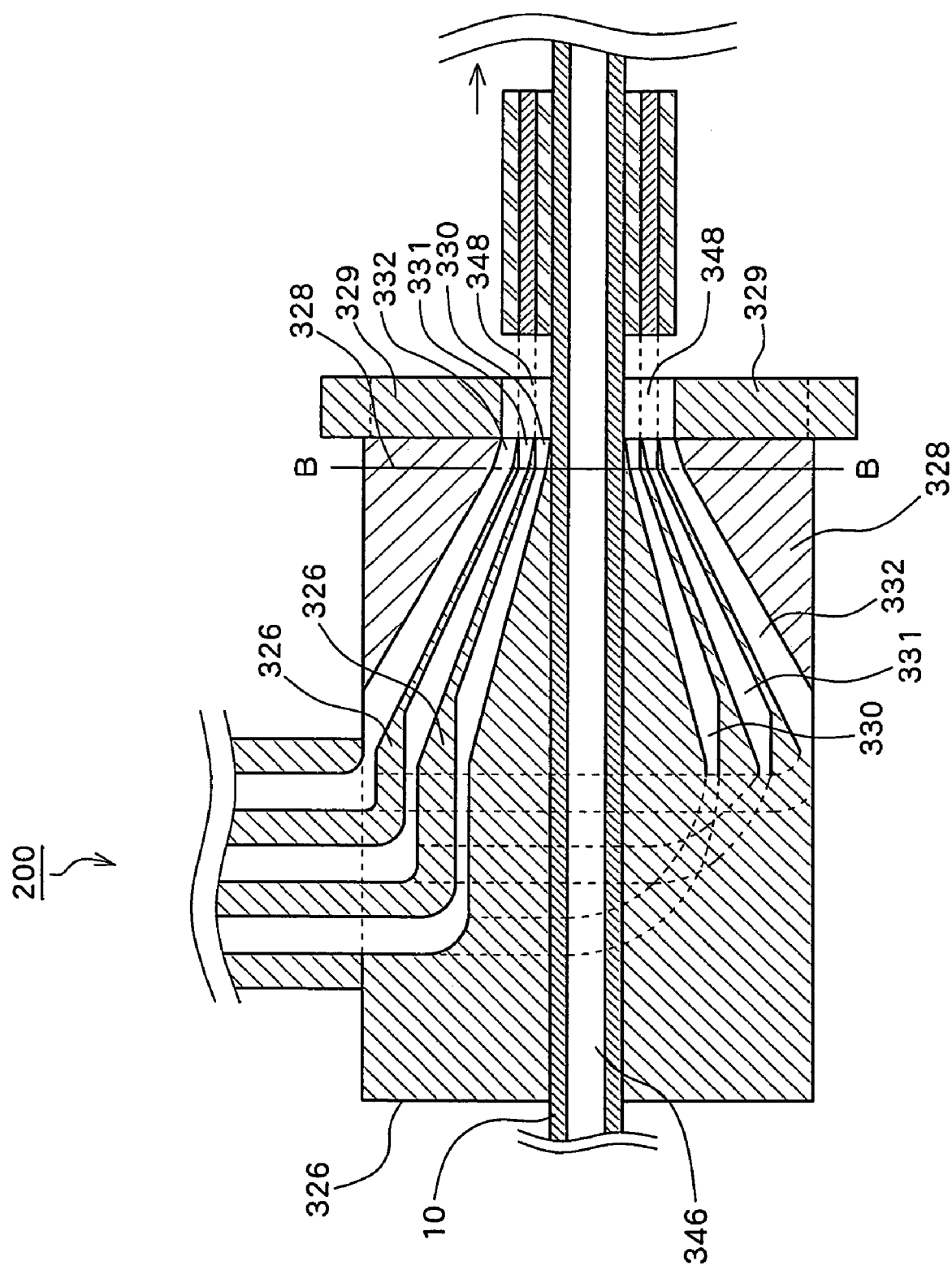
FIG. 4 is a cross-sectional view showing an outline of the main elements in the structure of a production apparatus 200 for a tubular fuel cell according to another embodiment of the present invention.

Furthermore, the first extrusion device 50, the second extrusion device 150 and the third extrusion device 250 need not be separate devices, and may be integrated within a single device. FIG. 4 shows a production apparatus 200 for a tubular fuel cell that includes a first extruder 22, a second extruder 122 and a third extruder 222 as another possible embodiment of the present invention. In FIG. 4, because the first extruder 22, the second extruder 122 and the third extruder 222 are identical with the extruders used in the production apparatus 100 for a tubular fuel cell shown in FIG. 2, these structures are omitted from the figure, and the figure instead shows the structures of the nipple and the die inside the crosshead, which differ from the structures of FIG. 2.

In FIG. 4, the production apparatus 200 for a tubular fuel cell includes a nipple 326, a first die 328, and a second die 329 within the opening inside the crosshead.

Figure 5:
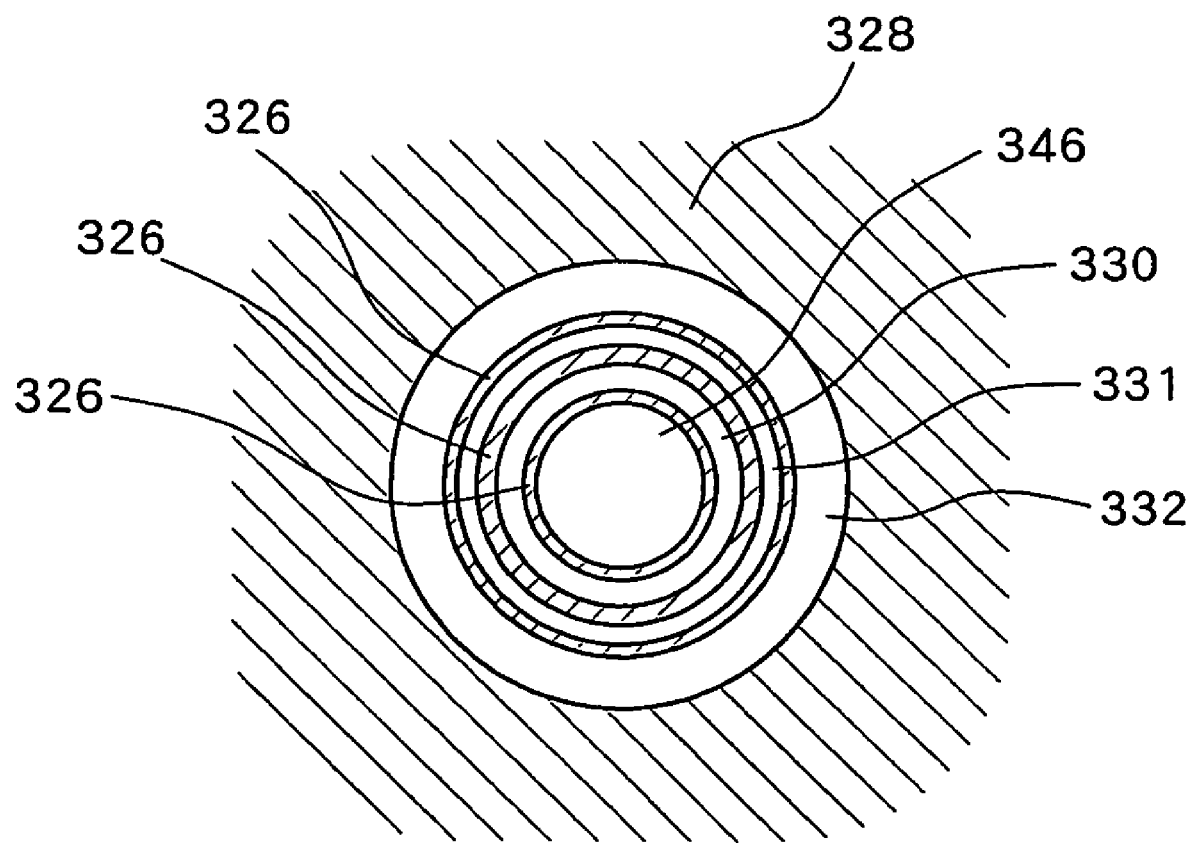
FIG. 5 is a cross-sectional view along the line B-B for the production apparatus 200 for a tubular fuel cell shown in FIG. 4.

FIG. 5 shows a cross-sectional view along the line B-B shown in FIG. 4. As shown in FIG. 5, the nipple 326 contains an aperture 346, which passes through the nipple along the central axis from the conically shaped tip, and into which the inner electrode 10 is able to be inserted, as well as a first space 330 and a second space 331, which are formed as conical shapes about substantially the same axis, with the first space positioned closer to the center.

The first die 328 is formed so as to surround the tip of the nipple 326 while forming a third space 332 between itself and the nipple 326, and also includes an opening 348 formed in a position corresponding with the aperture 346 within the nipple 326.

The first catalyst layer material, the electrolyte layer material, and the second catalyst layer material are forced into the first space 330, the second space 331, and the third space 332 respectively, using a first extruder, a second extruder and a third extruder which are not shown in the figure. The first catalyst layer material, the electrolyte layer material, and the second catalyst layer material forced into the first space 330, the second space 331 and the third space 332 respectively are supplied from a region in the vicinity of the tip of the nipple 326, so as to form sequential layers on the outer peripheral surface of the inner electrode 10 at a position near the interface with the second die 329.

The second die 329 comprises a plurality of members that are able to slide relative to the first die 328, and by moving these members of the second die 329 in or out in the direction of the center of the opening 348, the shape of the opening 348 can be altered. The size of the opening 348 can be reduced to the point where, when the inner electrode 10 passes through the aperture 346 and the opening 348, the second die 329 makes contact with the passing inner electrode 10. Furthermore at the same time that the size of the opening 348 within the second die 329 is reduced, the surface of the second die 329 that faces the nipple 326 makes contact with the various tips of the nipple 326, meaning the first space 330, the second space 331 and the third space 332 can be sequentially blocked or closed off.

Once the first catalyst layer material, the electrolyte layer material, and the second catalyst layer material have been supplied along a predetermined length on the outer peripheral surface of the inner electrode 10, the second die 329 is brought into contact with the outer peripheral surface of the inner electrode 10, and the layer material supply passages from at least a portion of, or alternatively all off, the first space 330, the second space 331, and the third space 332 are either blocked or closed off, thereby halting all supply of the first catalyst layer material, the electrolyte layer material, and the second catalyst layer material to the inner electrode 10. By continuing the movement of the inner electrode 10 with the supply of the first catalyst layer material, the electrolyte layer material and the second catalyst layer material halted, an exposed portion 102 is formed in which the first catalyst layer material does not cover the outer peripheral surface of the inner electrode 10.

Once this exposed portion 102 of the outer peripheral surface of the inner electrode 10 has been formed along a predetermined length, the second die 329 is once again expanded to a width that is larger than the outer peripheral surface of the inner electrode 10 by a predetermined quantity, the first space 330, the second space 331 and the third space 332 are re-opened, and supply of the first catalyst layer material, the electrolyte layer material and the second catalyst layer material to the inner electrode 10 is restarted.

By moving the second die 329 through a predetermined spacing in this manner, the first catalyst layer 12, the electrolyte layer 14, and the second catalyst layer 16 can be formed intermittently, while exposed portions 102 of the outer peripheral surface of the inner electrode 10 are also formed. Accordingly, members that correspond with the detection units 42 and 44 described in FIG. 1 and FIG. 2 are not necessarily required in this embodiment.

In this embodiment, the nipple 326 may employ either a single member or a combination of a plurality of members, provided the overall structure forms the first space 330, the second space 331 and the third space 332.

In this manner, supply of the first catalyst layer material, the electrolyte layer material and the second catalyst layer material can be reliably halted by bringing the inner peripheral surface of any of the dies 28, 128 and 228, or the second die 329 into contact with the outer peripheral surface of the inner electrode 10.

In these embodiments of the present invention, intermittent supply of the layer materials to the outer peripheral surface of the inner electrode 10 can also be achieved by providing a gear pump or the like (not shown in the figures) between the extruder and the crosshead, and using this gear pump to achieve intermittent supply of the layer materials to the crosshead. Even in those cases where this type of alternative device is used, the inner peripheral surface of a die that is able to move in and out relative to the outer peripheral surface of the inner electrode 10 is preferably still brought into contact with the outer peripheral surface of the inner electrode 10, thereby ensuring that the supply of at least one of the first catalyst layer material, the electrolyte layer material and the second catalyst layer material is halted reliably.

As described above, an intermittent laminate 80 obtained using the production apparatus 100 or 200 for a tubular fuel cell according to an embodiment of the present invention, wherein the first catalyst layer 12, the electrolyte layer 14 and the second catalyst layer 16 are laminated in that order in an intermittent manner along the outer peripheral surface of the inner electrode 10, is subsequently transported to a cutting step. FIG. 6 shows an example of a method of obtaining tubular fuel cell single cells by cutting the intermittent laminate 80.

Figure 7:
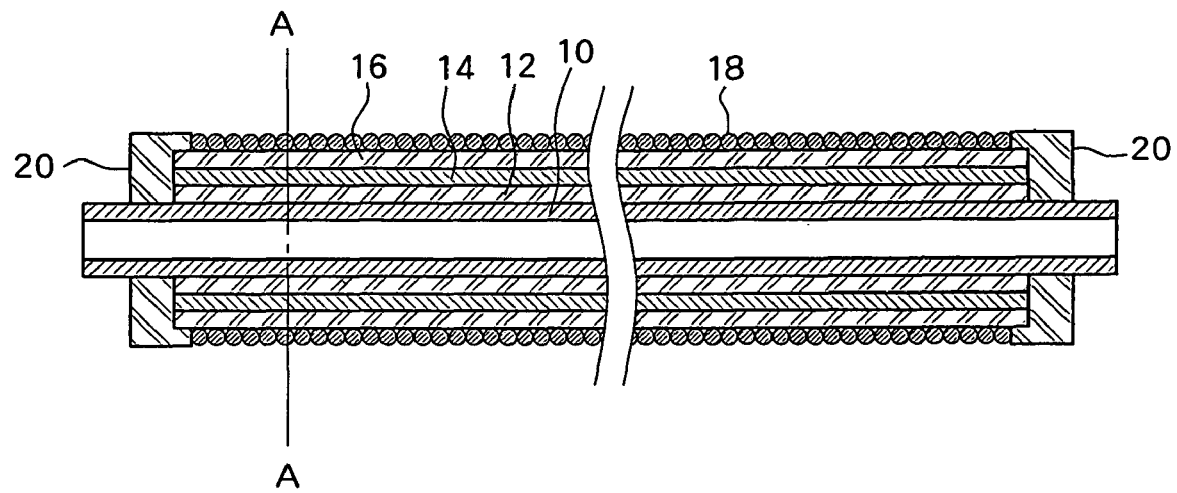
FIG. 7 is a cross-sectional view along the lengthwise direction of the tube of a conventional tubular fuel cell.
Figure 8:
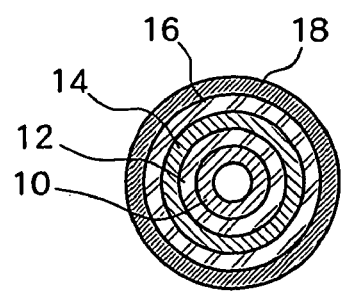
FIG. 8 is a cross-sectional view along the line A-A for the tubular fuel cell shown in FIG. 7

As shown in FIG. 6, by performing cutting at the exposed portions 102 of the outer peripheral surface of the inner electrode 10, a plurality a tubular fuel cell single cells can be obtained. A tubular fuel cell single cell obtained in this manner may be provided with an external coil 18 and a resin seal 20 to form the type of tubular fuel cell single cell shown in FIGS. 7 and 8, or may be combined with other members to form a tubular fuel cell module comprising a plurality of tubular fuel cells. In either case, the wasteful step of removing the first catalyst layer 12, the electrolyte layer 14 and the second catalyst layer 16 is unnecessary, and the product tubular fuel cells can be favorably employed.

In an embodiment of the present invention, although there are no particular restrictions on the size of the tubular fuel cell produced, the length of the inner electrode 10 is preferably within a range from approximately 10 to 200 mm. In such cases, the thickness of the inner electrode 10 is typically equivalent to a diameter within a range from, for example, 0.5 to 10 mm, and is preferably from 1 to 3 mm. Furthermore, the thickness of the first catalyst layer 12 is typically within a range from, for example, 10 to 200 μm, and is preferably from 30 to 50 μm. The thickness of the electrolyte layer 14 is typically within a range from, for example, 10 to 200 μm, and is preferably from 30 to 50 μm. The thickness of the second catalyst layer 16 is typically within a range from, for example, 1 to 100 μm, and is preferably from 1 to 20 μm.

Furthermore, in an embodiment of the present invention, there are no particular restrictions on the inner electrode 10, provided it is a cylindrically shaped material with favorable conductivity, and ideal materials include gold, platinum, copper, stainless steel, and alloys containing such metals. In order to reduce the contact resistance, the inner electrode 10 may also be coated with appropriate gold plating or the like. Furthermore, in order to function as a supply passage that facilitates diffusion of the raw materials such as the fuel gas, a porous member of a conductive material such as carbon, or titanium or carbon that has been surface-coated with a metal such as gold or platinum may also be used.

In the extrusion molding method described above, a paste formed by dispersing the catalyst powder for the first or second catalyst layer in a solution formed by dissolving a resin such as a solid polymer electrolyte like Nafion (a registered trademark) in an alcohol-based solvent such as methanol, ethanol or isopropanol, or alternatively, a paste formed by dissolving a solid polymer electrolyte or the like used for the electrolyte layer in an alcohol-based solvent or the like, can be favorably employed. Furthermore, a water-soluble paste obtained by adding a small quantity of a suitable dispersant may also be used.

In an embodiment of the present invention, during the sequential lamination of the first catalyst layer 12, the electrolyte layer 14 and the second catalyst layer 16 to the outer peripheral surface of the inner electrode 10, if required, any of a variety of methods may be employed to prevent adjacent layers from mixing and becoming turbid, resulting in a deterioration in the performance of the tubular fuel cell. For example, suitable methods include providing a drying device that uses hot air or heating to dry at least one of the layers, either prior to or following lamination of a plurality of layers, conducting the formation of alternate layers using solvents that are substantially immiscible, such as water and organic solvents, or raising the viscosity of the first catalyst layer material, the electrolyte layer material and the second catalyst layer material, although this is not a restrictive list, and any suitable method may be employed.

By appropriate alterations to the extrusion molding materials, the present invention need not be restricted to the formation of solid polymer electrolyte tubular fuel cells, but may instead by favorably applied to the production of all manner of tubular fuel cells.

As described above, according to embodiments of the present invention or modifications thereof, the production cost of tubular fuel cells can be reduced by ensuring that the first catalyst layer, the electrolyte layer and the second catalyst layer are not formed in those regions where they are not required.

The invention claimed is:

1. A method of producing a tubular fuel cell having a cylindrical inner electrode that exhibits conductivity, a first catalyst layer, an electrolyte layer, and a second catalyst layer, comprising:
   supplying a first catalyst layer material to an outer peripheral surface of the inner electrode by extrusion molding, thereby forming the first catalyst layer;
   supplying an electrolyte layer material to an outer peripheral surface of the first catalyst layer by extrusion molding, thereby forming the electrolyte layer;
   supplying a second catalyst layer material to an outer peripheral surface of the electrolyte layer by extrusion molding, thereby forming the second catalyst layer;
   detecting, using an apparatus comprising a detection unit, at least one of where the first catalyst layer is formed on the outer peripheral surface of the inner electrode and where the electrolyte layer is formed on the first catalyst layer;
   determining start and stop times for intermittently supplying at least one of the electrolyte layer material and the second catalyst layer material based on an output of the detection unit; and
   intermittently supplying the first catalyst layer material, the electrolyte layer material, and the second catalyst layer material using the determined start and stop times, thereby forming the first catalyst layer, the electrolyte layer, and the second catalyst layer with at least a portion of the outer peripheral surface of the inner electrode left exposed.

2. The method of producing a tubular-fuel cell according to claim 1, wherein
   following supply of the first catalyst layer material, the electrolyte layer material and the second catalyst layer material along a lengthwise direction of the-inner electrode, the outer peripheral surface of the inner electrode is exposed by temporarily stopping the supply of the first catalyst layer material, the electrolyte layer material and the second catalyst layer material.

3. The method of producing a tubular fuel cell according to claim 1,
   further comprising a step of conducting cutting at a location where the outer peripheral surface of the inner electrode is exposed, thereby forming a plurality of tubular fuel cell single cells.

4. The method of producing a tubular fuel cell according to claim 2,
   further comprising a step of conducting cutting at a location where the. outer peripheral surface of the inner electrode is exposed, thereby forming a plurality of tubular fuel cell single cells.

5. The method of producing a tubular fuel cell according to claim 1, wherein the inner electrode is formed from a porous material.

6. The method of producing a tubular fuel cell according to claim 1,
   further comprising a drying step following at least one of the steps of forming the first catalyst layer, forming the electrolyte layer, and forming the second catalyst layer.

7. The method of producing a tubular fuel cell according to claim 1, wherein the detecting step further comprises:
   determining a difference between an external diameter of the inner electrode and an external diameter of at least one of the first catalyst layer and the electrolyte layer; and
   determining where at least one of the first catalyst layer and the electrolyte layer stops and starts.

8. The method of producing a tubular fuel cell according to claim 1, further comprising, after the detecting, synchronizing the supplying of the first catalyst layer material, the supplying of the electrolyte layer material, and the supplying of the second catalyst layer.

9. The method of producing a tubular fuel cell according to claim 1, wherein the determining step further comprises determining the start and stop times for intermittently supplying at least one of the electrolyte layer material and the second catalyst layer material based on a predetermined travel speed of the inner electrode.

* * * * *